(12) United States Patent
Kinno et al.

(10) Patent No.: US 6,612,746 B2
(45) Date of Patent: Sep. 2, 2003

(54) ROLLING APPARATUS HAVING SURFACE-TREATED ROLLING MEMBER

(75) Inventors: Dai Kinno, Kanagawa (JP); Koichi Hachiya, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 08/902,954

(22) Filed: Jul. 30, 1997

(65) Prior Publication Data
US 2002/0023695 A1 Feb. 28, 2002

(30) Foreign Application Priority Data

Jul. 30, 1996 (JP) .............................. 8-200606
Jun. 10, 1997 (JP) .............................. 9-152503

(51) Int. Cl.$^7$ ............................................. F16C 13/00
(52) U.S. Cl. ..................... 384/418; 148/250; 148/248
(58) Field of Search ................... 148/246, 250, 148/271, 283; 106/14.26, 14.43; 384/418, 13; 72/237

(56) References Cited

U.S. PATENT DOCUMENTS

| | | | |
|---|---|---|---|
| 4,054,426 A | 10/1977 | White | |
| 4,206,268 A | 6/1980 | Roemer et al. | |
| 4,288,335 A | * 9/1981 | Rivier | ......................... 548/101 |
| 4,351,678 A | 9/1982 | Andrien et al. | |
| 4,457,790 A | 7/1984 | Lindert et al. | |
| 4,495,008 A | 1/1985 | Bruno et al. | |
| 4,508,396 A | 4/1985 | Doi et al. | |
| 5,252,391 A | 10/1993 | Sasaki et al. | |

FOREIGN PATENT DOCUMENTS

| | | |
|---|---|---|
| GB | 1190987 | 5/1970 |
| GB | 1352866 | 5/1974 |
| GB | 2040367 A | 8/1980 |
| GB | 1600951 | 10/1981 |
| JP | 5778494 | 5/1982 |
| JP | 5949297 | 3/1984 |
| JP | 63293322 | 11/1988 |
| JP | 6455419 | 3/1989 |

* cited by examiner

Primary Examiner—Scott Kastler
(74) Attorney, Agent, or Firm—Sughrue Mion, PLLC

(57) ABSTRACT

A rolling apparatus has a surface-treated rolling member composed of a metallic rolling element and a metallic race element which have been used with a lubricant, in which the surface of at least one of the rolling element and the race element has a reaction product subsurface layer containing phosphorus and oxygen and having a thickness of from about 30 to 600 nm, where the reaction product subsurface layer has been produced by reaction between the metallic component of the rolling element or the race element and an organic phosphorus compound. The lubricant contains, as an extreme pressure component, an organic phosphorus compound; the lubricant contains the organic phosphorus compound at a concentration of 10 to 10,000 ppm in terms of phosphorus; and the lubricant is present between the metallic contact surfaces of the rolling member and the race element.

8 Claims, 6 Drawing Sheets

Fa : 400Kgf

ROLLING APPARATUS HAVING SURFACE-TREATED ROLLING MEMBER

FIELD OF THE INVENTION

The present invention relates to a rolling apparatus having a rolling member composed of a metallic rolling element and a metallic race element, at least one of the rolling element and the race element having been subjected to surface treatment for improving resistance to seizure and wear. More particularly, it relates to an improvement on lubricity in rolling apparatus, such as rolling bearings, linear guide apparatus, and ball screw apparatus.

BACKGROUND OF THE INVENTION

Lubrication of the above-mentioned rolling apparatus having a rolling member is achieved with lubricants, such as oil and grease. The lubricant serves to form an oil film on the surfaces of the metallic rolling apparatus in contact with each other thereby to reduce the friction on the contact surfaces and to improve wear resistance. Under boundary lubrication in which a lubricating film may possibly be broken, and metal surfaces can come into direct contact with each other to cause solid friction or mixed friction, an extreme pressure additive for improving resistance to wear and seizure is added to the lubricant to prevent seizure and friction between metal surfaces.

However, lubricants such as lubricating oil and grease reduce their viscosity and consistency as temperature elevates as is expressed in terms of viscosity index. Therefore, as temperature increases, the film-forming function of the lubricant is reduced, and it follows that the contact surfaces of the metallic rolling member of a rolling apparatus come into the state of boundary lubrication. Under boundary lubrication, the extreme pressure additive added to the lubricant acts to prevent seizure through its chemical reaction. The problem in this case is that the non-seizure effect as expected cannot be obtained unless there is an outer factor (e.g., heat) inducing the chemical reaction between the extreme pressure additive and the metal surface.

SUMMARY OF THE INVENTION

The present invention has been completed taking a note of the above-described problem of lubrication associated with conventional rolling apparatus. Accordingly, an object of the present invention is to provide a rolling apparatus having a surface-treated rolling member exhibiting improved resistance against seizure and wear, in which an extreme pressure reaction film is previously formed on the metal surface to improve the wettability of the metal surface by a lubricant, and the wetting is maintained while running.

In order to accomplish the above object, the present invention provides a rolling apparatus having a surface-treated rolling member composed of a metallic rolling element and a metallic race element which have been used with a lubricant, in which the surface of at least one of the rolling element and the race element has a film comprising a compound produced by the reaction between the metallic component of the rolling element or the race element therefor and at least one compound selected from the group consisting of a phosphorus compound, a sulfur compound, a halogen compound, and an organometallic compound (the film will hereinafter be referred to as "reaction product subsurface layer"), and a lubricant (oil or grease) containing at least one compound selected from the group consisting of an organic phosphorus compound, an organic sulfur compound, an organic halogen compound, and an organometallic compound as an extreme pressure component is present between the metallic contact surfaces of the rolling member.

DETAILED DESCRIPTION OF THE INVENTION

Figure 1:
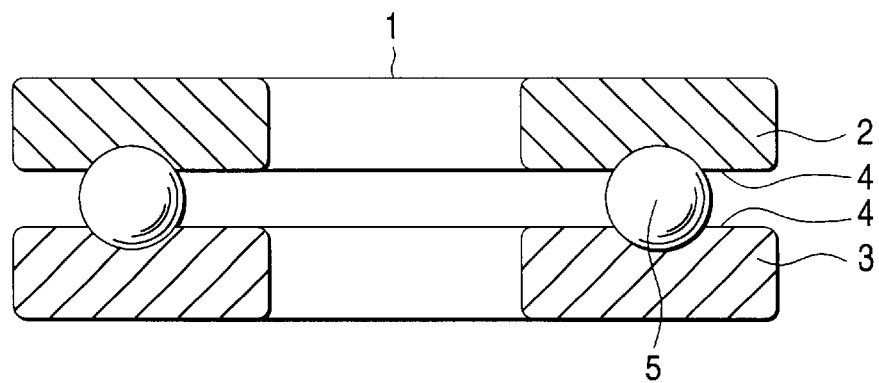
FIG. 1 is a cross section of a thrust bearing according to a first embodiment of the present invention.

The reaction product subsurface layer formed on the contact surface makes the metallic surface more wettable by a lubricant, thereby to accelerate the reaction of the surface with an extreme pressure additive in the lubricant, which leads to improvement in seizure resistance and wear resistance. Compared with an ordinary metal surface, the metal surface having the reaction product subsurface layer is more ready to enjoy the effects of an extreme pressure additive on seizure and wear.

It is preferred that the reaction product subsurface layer has a thickness of 10 to 500 nm and the lubricant contains the extreme pressure component in a concentration of from 10 to 50,000 ppm, particularly from 10 to 10,000 ppm, in terms of at least one of phosphorous, sulfur and halogen.

The reaction product subsurface layer can be formed by immersing a metallic rolling member to be surface treated in a solution comprising an oil or organic solvent and at least one compound selected from the group consisting of a phosphorus compound, a sulfur compound, a halogen compound and an organometallic compound or coating the surface of the rolling member with the solution, and thermally decomposing the compound(s) to carry out the reaction. The thickness and surface roughness of the reaction product subsurface layer can be controlled through adjustments of the concentration of the compound(s) in the solution or the reaction temperature and time.

The phosphorus compound which can be used to form a reaction product subsurface layer (a phosphorus reaction product subsurface layer) includes phosphorous esters, orthophosphoric esters, and acid phosphoric esters. These compounds can be used either individually or as a mixture of two or more thereof.

The sulfur compound which can be used to form a reaction product subsurface layer (a sulfur reaction product subsurface layer) includes sulfated fats and oils, olefin sulfides, mercaptans, sulfides, sulfoxides, and sulfones. These compounds can be used either individually or as a mixture of two or more thereof.

The halogen compound which can be used to form a reaction product subsurface layer (a halogen reaction product subsurface layer) includes halogenated paraffins, halogenated fats and oils, particularly chlorinated paraffins and chlorinated fats and oils. These compounds can be used either individually or as a mixture of two or more thereof.

The organometallic compound which can be used to form a reaction product subsurface layer (an organometallic reaction product subsurface layer) includes metal dihydrocarbyldithiophosphates, metal dihydrocarbyldithiocarbamates, and metal naphthenates.

The phosphorus compound, sulfur compound, and halogen compound which can be used to form a reaction product subsurface layer may be either organic or inorganic. Furthermore, the compounds which can be used as an extreme pressure additive in the present invention described below may be used to form a reaction product subsurface layer.

The lubricant which can be used in the present invention can be oil or grease to which at least one organic compound containing at least one of phosphorus, sulfur, and halogen has been added as an extreme pressure component. The extreme pressure additive added to the lubricant as an extreme pressure component can be either a polar compound or a non-polar compound as long as it is compatible with the base oil of the lubricant. It is not particularly necessary to consider matching between the reaction product subsurface layer formed on the metal surface of a metallic rolling member and the extreme pressure additive. Specific examples of extreme pressure additives to be added to the base oil include phosphoric esters, organometallic compounds, zinc dithiophosphate, and organomolybdenum compounds, e.g., MoDTP and Mo-dithiocarbamate.

The extreme pressure component is preferably added in such an amount that the concentration of phosphorous, sulfur, or halogen is 10 ppm or more, and the amount of the extreme pressure component is preferably in the range of from 10 to 5000 ppm, more preferably from 50 to 5000 ppm. If the concentration of the extreme pressure component in a lubricant is less than 10 ppm, the reaction product subsurface layer formed on the metal surface of the metallic rolling member produces only slight effects in improving resistance to seizure. If the concentration of the extreme pressure component in a lubricant exceeds 5000 ppm, the lubricant tends to have poor film-forming properties because of the excessive extreme pressure component concentration. Accordingly, the upper limit of the extreme pressure component concentration is preferably 5000 ppm, while varying depending on the phosphorus, sulfur and/or halogen content of the extreme pressure component.

According to the present invention, the metal surface of the rolling member of a rolling apparatus is provided with improved wettability by a lubricant by the formation of a reaction product subsurface layer containing a phosphorus compound, a sulfur compound, a halogen compound, an organometallic compound or a combination thereof on the metal surface. As a result, the metal surface is hardly exposed. Further, the extreme pressure component present in the lubricant in a given concentration reacts with the activated reaction product subsurface layer, whereby film formation by the lubricant can be maintained. Thus, as compared with an ordinary metal surface, the metal surface having the reaction product subsurface layer enjoys the effects of the extreme pressure additive on seizure and wear more easily to improve the resistance to seizure and wear of the rolling apparatus.

The rolling apparatus according to the present invention can be a rolling bearing (FIG. 1), in which case metallic rollers or balls are equivalent to the "rolling element", and raceways on which rolling elements roll are equivalent to the "race element", the rollers or balls and the raceways constituting a rolling member. The rolling apparatus of the present invention can also be a linear guide apparatus (FIG. 4), in which case metallic rollers or balls are equivalent to the "rolling element", and rolling grooves of the guide rail on which the rolling elements roll are equivalent to the "race element", the roller or balls and the rolling grooves constituting a rolling member.

The embodiments for carrying out the present invention will be described with reference to the accompanying drawings.

(I) First Embodiment

FIG. 1 is a cross section of a first embodiment in which the present invention is applied to a thrust bearing having a rolling member composed of metallic rolling elements and race elements therefor to improve resistance to seizure.

The thrust bearing 1 shown in FIG. 1 is a cageless ball type rolling member comprising upper and lower races 2 and 3 as race elements and balls 5 as rolling elements rolling on these race elements. The upper and lower races 2 and 3 of the thrust bearing 1 were surface-treated according to the present invention to form a reaction product subsurface layer. The bearing was combined with a lubricating oil containing an extreme pressure additive and subjected to a seizure test.

(1) Preparation of Samples

The surface (raceway) 4 of the races 2 and 3 of a thrust bearing 1 was cleaned with petroleum benzine and immersed in synthetic oil containing 10% by weight of dibutyl sulfide at 160° C. for 10 hours to form a 40 nm thick sulfur reaction product subsurface layer on the raceway 4.

The thickness of the reaction product subsurface layer was measured with an X-ray photoelectron spectrophotometer (XPS). Measurement with XPS is carried out by irradiating a sample with X-rays and analyzing the energy of photoelectrons emitted from the outermost surface (about several angstroms deep) of the sample to get qualitative and quantitative information about the elements on the sample surface and the state of bonding of the elements. It is also possible to analyze the distribution of the elements in the thickness direction by making the measurement with XPS while sputtering (etching) the surface with an argon (Ar) ion gun. For example, in measuring the thickness of a reaction product subsurface layer formed by using an organic sulfur compound, the depth profile of a sample is obtained with XPS while sputtering with an argon ion gun at a constant etching rate (e.g., 3 nm/min). The depth immediately before the point at which the photoelectron intensity assigned to sulfur in the reaction product subsurface layer comes to show no change is taken as the thickness of the film.

It should be noted that the reaction product subsurface layer is not a layer laminated on the surface of a sample (matrix) but a layer integral with the matrix which is formed from the surface toward the inside on chemical reaction of the matrix. In other words, unlike a layer merely laminated on the surface of the matrix, the reaction product subsurface layer is hardly separated. Therefore, measurement of film thickness (i.e., depth from the matrix surface) needs sputtering with an ion gun as noted above.

(2) Seizure Resistance Test

The seizure resistance of the surface-treated thrust bearing 1 was evaluated.

Figure 2:
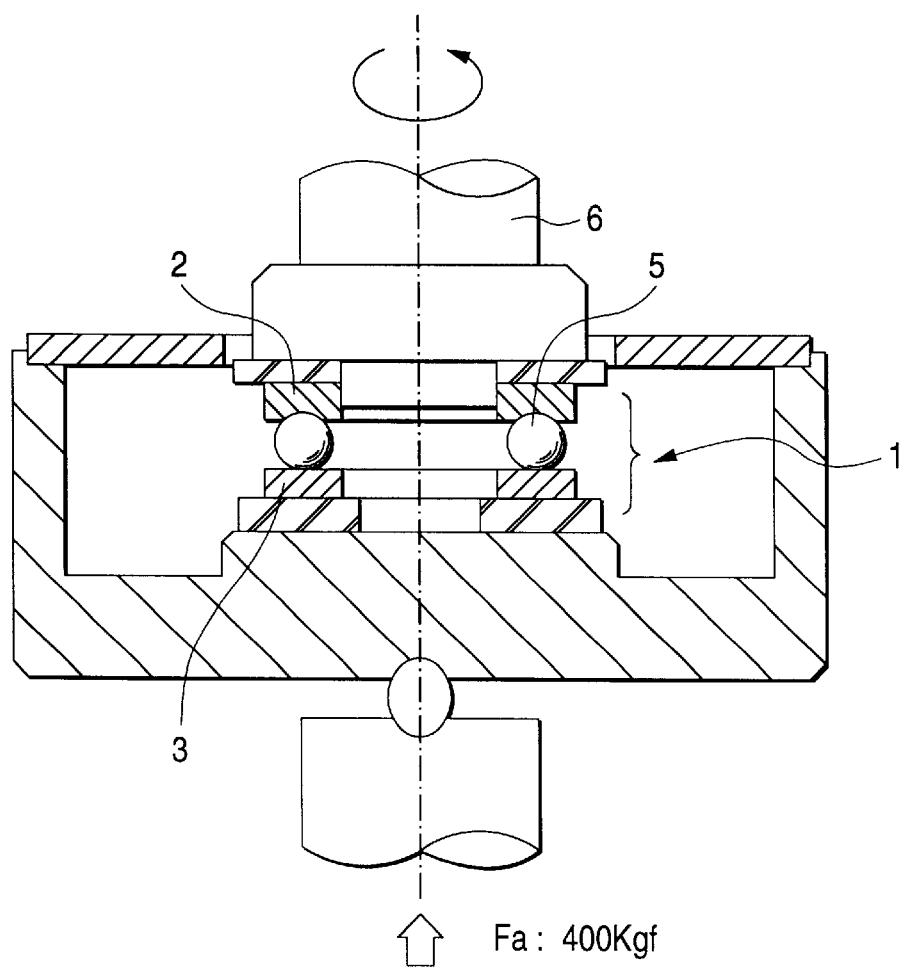
FIG. 2 is a cross section of a testing apparatus for evaluating the first embodiment.

As shown in FIG. 2, the upper and lower races 2 and 3 of the thrust bearing 1 were fitted to a vertical spindle 6, and the spindle was revolved at 7000 rpm with a thrust load Fa of 400 kgf applied as indicated with an arrow. The thrust bearing 1 had previously been lubricated by dropping 3 μl of spindle oil onto the rolling elements 5 and raceways 4 by means of a microsyringe. A plurality of spindle oil species containing a varied amount of n-butylmercaptan were prepared as a lubricant, and a plurality of seizure resistance tests were carried out using each of the lubricants. The time from the start of revolution to development of seizure was measured. The time when the reading of a thermocouple inserted in the lower lace 3 got out of the equilibrium state at 100° C. or lower and exceeded 200° C. was taken as a seizure time.

Figure 3:
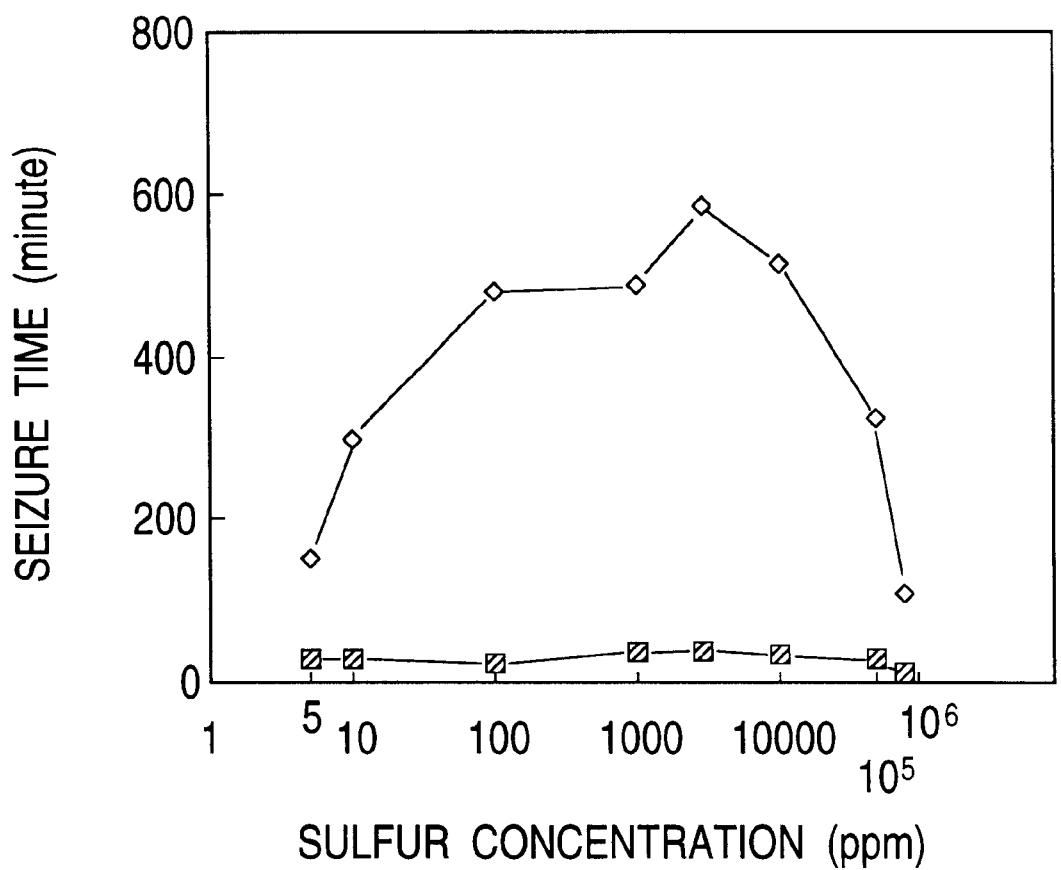
FIG. 3 is a graph showing the results of an evaluation test on the first embodiment.

The duration before development of seizure is shown in FIG. 3, in which the results of the surface-treated thrust bearing and the untreated thrust bearing are plotted as -◇- and -■-, respectively. It is apparent from the test results that the combination of the surfaces 4 of the races 2 and 3 of the bearing 1 having formed thereon a sulfur-containing reaction product subsurface layer and the organic sulfur compound-containing extreme pressure additive shows greatly improved seizure resistance over a broad range of the extreme pressure component concentration as compared with a combination of an untreated bearing and the same extreme pressure additive.

The thickness of the reaction product subsurface layer used in this embodiment is not particularly limited and can be selected arbitrarily by controlling the surface treatment conditions as far as the surface roughness is not adversely affected.

A suitable concentration of the extreme pressure component (sulfur in this embodiment) ranges from 10 to 50000 ppm. A concentration ranging from 100 to 10000 ppm is especially effective on prevention of seizure. If the concentration is less than 10 ppm, the effect in improving resistance to seizure is small. If it exceeds 50000 ppm, the lubricating effect of the base oil of the lubricant is lessened, failing to obtain improvements in performance.

(II) Second Embodiment

The second embodiment of the present invention will be illustrated.

Figure 4:
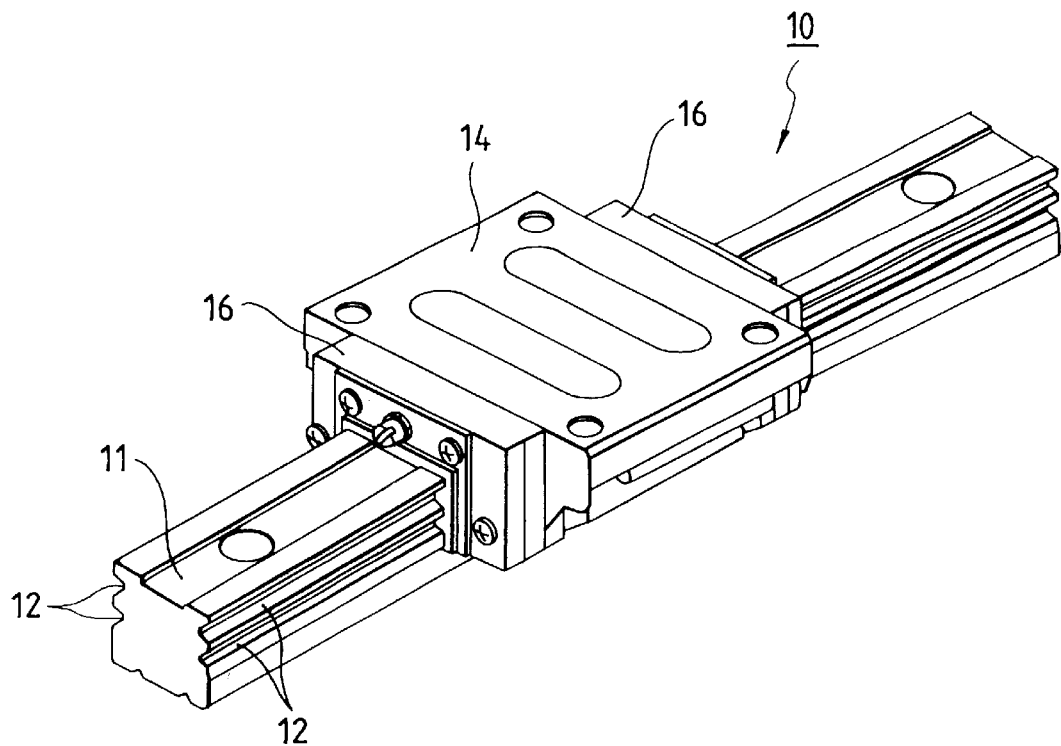
FIG. 4 is a perspective view of a linear guide apparatus according to a second embodiment of the present invention.
Figure 5:
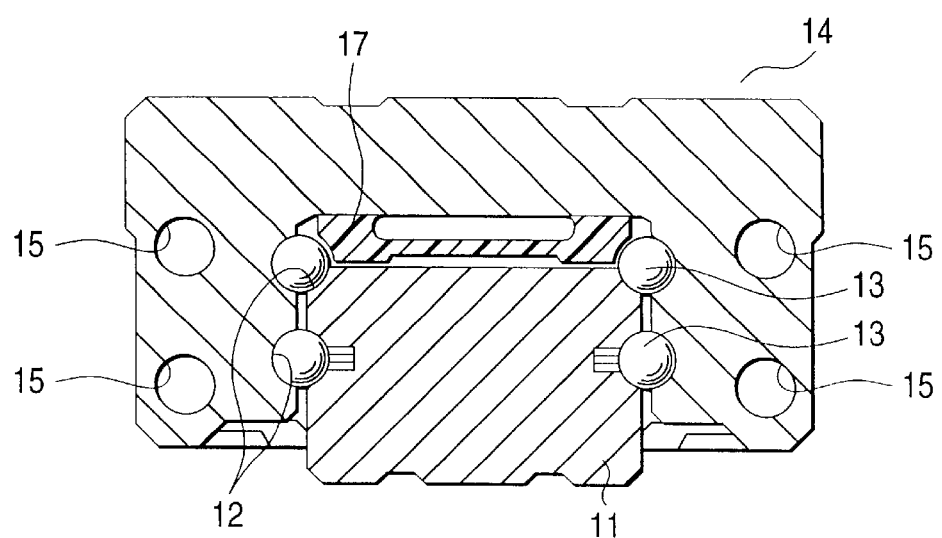
FIG. 5 is a cross section of the second embodiment.

FIG. 4 is a perspective general view of a linear guide apparatus as another embodiment of the rolling member having metallic rolling elements and race elements therefor, and FIG. 5 shows its cross section.

The linear guide apparatus 10 comprises a metallic guide rail 11 having rolling grooves 12 as race elements on its either side, a number of rolling elements 13 that roll on the rolling grooves 12, and a slider 14 that is fitted onto the guide rail 11 via the rolling elements 13. In the slider 14 there is a circulation passage for rolling elements which is composed of through-holes 15 made in the axial direction and a U-shaped passage made through end cap 16 provided on each end of the slider. The slider 14 slides both ways along the guide rail 11 with the rolling elements 13 circulating through the circulation passage. Numeral 17 is a plastic ball retainer.

(1) Preparation of Samples

In this embodiment, a reaction product subsurface layer having a thickness of 50 nm was formed on the surface of rolling elements 13 by immersing the rolling elements 13 in a 5 wt % solution of dilauryl hydrogenphosphite in a synthetic hydrocarbon solvent at 110° C. for 4 hours. The thus treated rolling elements 13 were set in a slider 14, and the slider with the rolling elements was fitted onto a guide rail 11 to assemble a linear guide apparatus 10.

(2) Wear Resistance Test

The wear resistance of the resulting surface-treated linear guide apparatus 10 was evaluated as follows.

The vacant space of the slider 14 of the linear guide apparatus 10 was filled with 1 g of commercially available grease to which an extreme pressure additive had been added. The slider 14 was made to slide two ways along the guide rail 11 over a total distance of 500 km under an applied load of 200 kgf by adjusting the diameter of the rolling elements (balls) 13. Thereafter the wear (μm) of the rolling grooves 12 of the guide rail 11 was measured.

Figure 6:
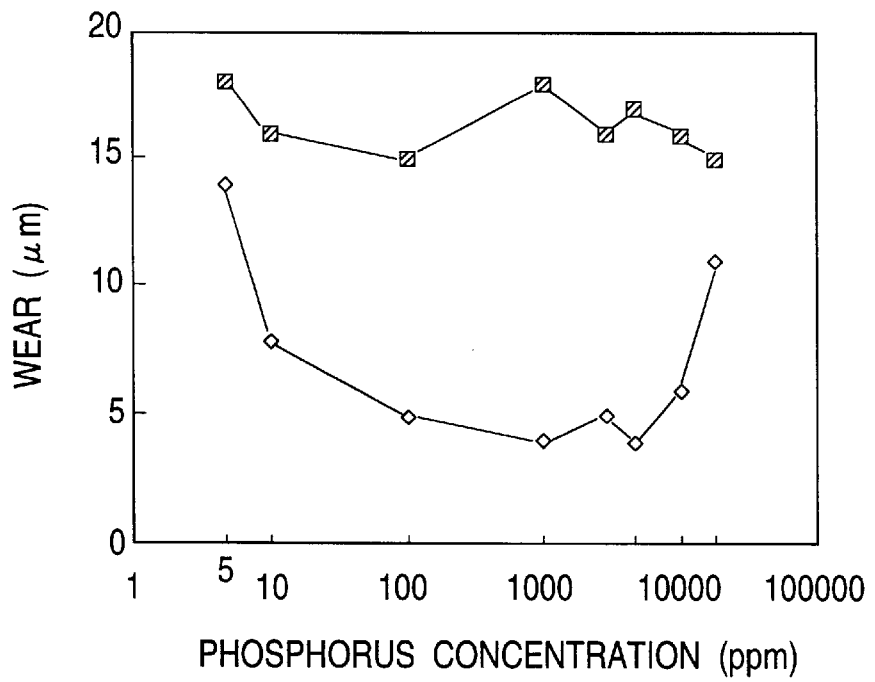
FIG. 6 is a graph showing the results of an evaluation test on the second embodiment.

Trioctyl phosphite was chosen as an extreme pressure additive added to the grease. The above test was repeatedly carried out under the same conditions but using grease containing the extreme pressure additive in a varied phosphorus concentration to measure the wear of the rolling grooves 12. The results obtained are shown in FIG. 6, in which the results of the surface-treated thrust bearing and the untreated thrust bearing are plotted as -◇- and -■-, respectively.

As can be seen from the test results, a preferred content of the extreme pressure component (phosphorus in this particularly embodiment) in grease ranges from 10 to 20000 ppm, and a range of from 100 to 5000 ppm is particularly effective in improving wear resistance. If the phosphorus content is less than 10 ppm, the wear improving effect is small. A phosphorus content exceeding 20000 ppm adversely affects the lubricating performance of the base oil of the grease, and no improvements in wear resistance is expected.

It is apparent from this embodiment that the combination of the phosphorus-containing reaction product subsurface layer and an organic phosphorus compound, which is an extreme pressure additive added to grease, produces a considerable effect in improving wear resistance.

(III) Third Embodiment

A single row deep groove ball bearing (JIS: 6206) as a sample was set on the testing apparatus shown in FIG. 2 horizontally and subjected to a revolution test. That is, either the balls or the inner race of the ball bearing was surface treated to form a reaction product subsurface layer, combined with a lubricating oil containing an extreme pressure additive, and subjected to a seizure resistance test. The results obtained were compared with those of Comparative Examples.

(1) Preparation of Samples

The balls or inner race of a ball bearing was immersed in a 4 wt % solution of TCP (tricresyl phosphate) in a synthetic hydrocarbon solvent at 180° C. for 40 hours to cause thermal decomposition thereby to form a 0.2 μm thick reaction product subsurface layer on the surface of the sample.

(2) Seizure Resistance Test

The seizure resistance of the resulting surface-treated ball bearing was evaluated.

The seizure resistance test was carried out by horizontally fitting the ball bearing to a vertical spindle 6 and revolving the spindle at 6000 rpm with a thrust load Fa of 400 kgf applied as shown in FIG. 2. Mineral oil-based grease to which MoDTC (molybdenum dithiocarbamate) had been added as an extreme pressure additive in an amount varying up to 10000 ppm in terms of sulfur concentration was used as a lubricant for the ball bearing. The site of the ball bearing which was subjected to the surface treatment and the content of the extreme pressure additive in the lubricant (grease) are shown in Table 1 below.

TABLE 1

| | Lubricant | Site of Surface Treatment | Extreme Pressure Additive Content (ppm) |
|---|---|---|---|
| Comparative Example 3-1 | grease | balls | 0 |
| Comparative Example 3-2 | grease + MoDTC | — | 10–10000 |
| Example 3-1 | grease + MoDTC | balls | 10–10000 |
| Example 3-2 | grease + MoDTC | inner race | 10–10000 |

Figure 7:
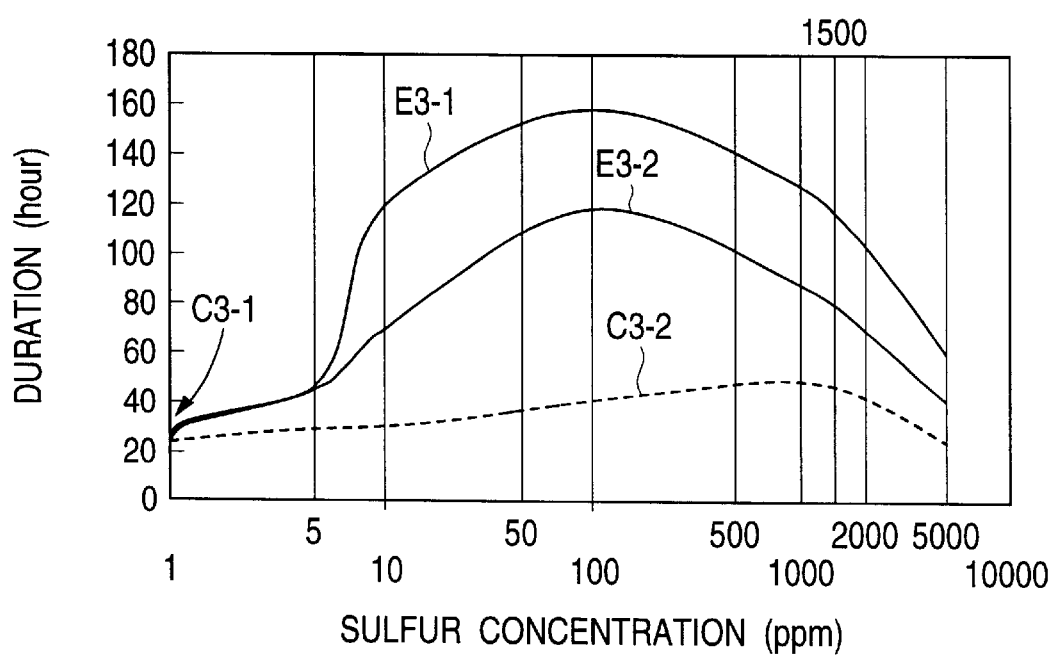
FIG. 7 is a graph showing the results of an evaluation test on a third embodiment of the present invention.

The relationship of duration up to seizure development (hour) vs. concentration of the additive (S concentration: ppm) is shown in FIG. 7, in which the curves indicated by C3-1, C3-2, E3-1, and E3-2 correspond to the results of Comparative Examples 3-1 and 3-2, and Examples 3-1 and 3-2, respectively.

Comparison of the durability test results between Comparative Example 3-1 and Example 3-1 reveals the synergistic effect of the combination of the surface treatment according to the present invention and an extreme pressure additive present in a lubricant in extending the life of a bearing.

Comparison between Comparative Example 3-2 and Examples 3-1 and 3-2 proves the effect of the surface treatment according to the present invention in lubrication using an extreme pressure additive-containing lubricant.

It is understood from FIG. 7 that the effective concentration of an extreme pressure additive in a lubricant preferably ranges from 10 to 2000 ppm, particularly from 10 to 1500 ppm, in terms of sulfur concentration.

It should be noted that the above-specified concentration range is by no means limiting and is subject to variation depending on the sulfur ratio in the organic sulfur compound used as an extreme pressure additive.

(IV) Fourth Embodiment

Samples were prepared by surface treating the same ball bearing as used in the third embodiment while altering the conditions of thermal decomposition, i.e., the reaction temperature and time, to form a reaction product subsurface layer having a thickness (depth) varying from 0.003 to 0.6 $\mu$m (=3 to 600 nm). The resulting samples were subjected to a seizure resistance test in the same manner as described above to examine the influence of the film thickness on the durability of the bearing.

The site of the heat treatment and the depth of the formed reaction product subsurface layer are shown in Table 2 below.

TABLE 2

| | Lubricant | Site of Surface Treatment | Reaction Product Subsurface Layer (nm) |
|---|---|---|---|
| Comparative Example 4 | grease + MoDTC | — | 0 |
| Example 4-1 | grease + MoDTC | rolling elements | 10–500 |
| Example 4-2 | grease + MoDTC | inner race | 10–500 |

Mineral oil-based grease containing 500 ppm, in terms of sulfur, of MoDTC as an extreme pressure component was used for lubrication of the ball bearing.

Figure 8:
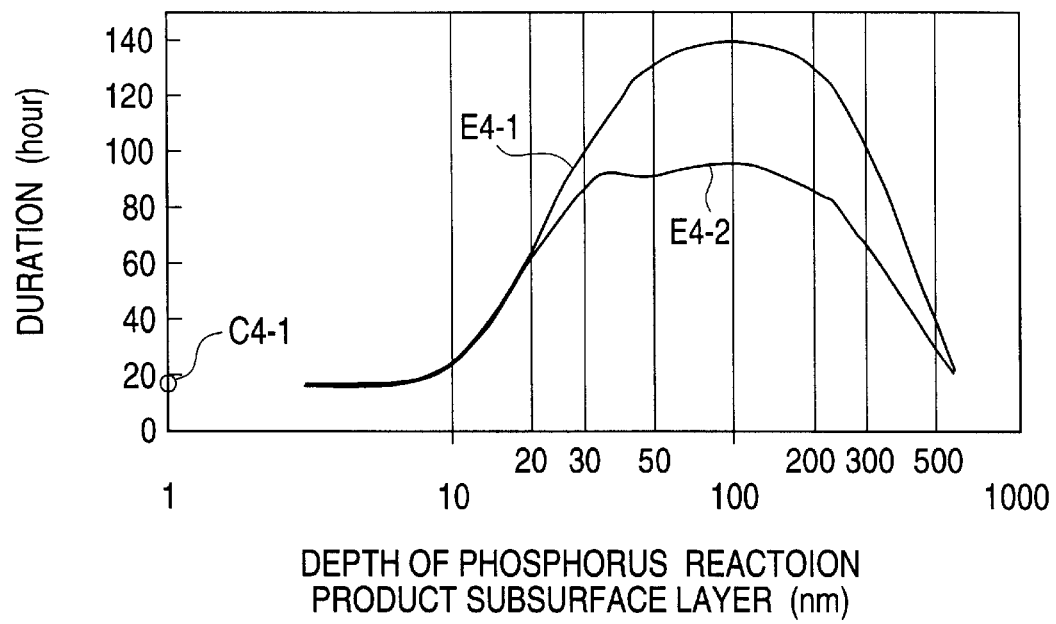
FIG. 8 is a graph showing the results of an evaluation test on a fourth embodiment of the present invention.

The relationship of durability up to development of seizure (hour) vs. depth (nm) of the reaction product subsurface layer is plotted in FIG. 8, in which the curves indicated by E4-1, E4-2, and C4-1 correspond to the results of Examples 4-1, 4-2 and Comparative Example 4-1, respectively. Comparison between Comparative Example 4-1 and Examples 4-1 and 4-2 provides confirmation to the effect of the surface treatment according to the present invention. It is seen that the effective depth of the reaction product subsurface layer formed by the surface treatment ranges from 10 to 500 nm, preferably from 30 to 300 nm, still preferably from 30 to 200 nm, and particularly preferably from 50 to 100 nm.

It is apparently revealed from the results of the third and fourth embodiments that the wear improving effect obtained from a combination of a phosphorus-containing reaction product subsurface layer and a lubricant containing an organic sulfur compound as an extreme pressure additive is significant equally to the effects produced from the combination of the first embodiment (a sulfur compound-containing reaction product subsurface layer+sulfur additive-containing lubricant) or the second embodiment (a phosphorus compound-containing reaction product subsurface layer+phosphorus additive-containing lubricant).

Effective extreme pressure additives that can be added to the lubricant for use in the present invention include, in addition to the above-described examples, organometallic sulfur compounds, organometallic phosphorus compounds, organometallic chlorine compounds, metal-free organic sulfur compounds, organic phosphorus compounds, and organic chlorine compounds. Some of these compounds contain nitrogen, oxygen, etc. as a constituent element. Commercially available lubricants generally contain phosphorus (P) type and sulfur (S) type additives in combination. Therefore, the reaction product subsurface layer according to the present invention can be used effectively in combination with these commercially available lubricants, either of phosphorus type or sulfur type.

(V) Fifth Embodiment

The present invention was applied to a ball bearing for the main shaft of a supercharger, and the bearing was tested under a non-oiling condition.

All the rolling elements (balls) and the outer and inner races of the ball bearing were surface treated in accordance with the present invention to have a reaction product subsurface layer. A combination of the surface treated bearing and a lubricating oil containing an extreme pressure additive was subjected to a seizure resistance test, and the results obtained were compared with those of Comparative Example.

(1) Preparation of Samples

The ball bearing for the main shaft of a supercharger used here is a three-point contact ball bearing having an inner diameter of 42 mm and an outer diameter of 86 mm, the inner race of which is divided into two. The sample of Example was prepared by immersing the balls and the outer and inner races in a 5 wt % solution of TCP in a synthetic hydrocarbon oil at 200° C. for 50 hours to induce thermal decomposition reaction thereby to form a reaction product subsurface layer containing both phosphorus and oxygen and having a practically uniform thickness (depth) of 100 to 120 nm on the surface. The sample of Comparative Example was prepared by immersing the balls and the inner and outer races in a synthetic hydrocarbon containing less than 10 ppm of TCP at 200° C. for 50 hours.

(2) Seizure Resistance Test

The resulting surface-treated ball bearings were tested to evaluate the resistance to seizure.

A non-oiling test was carried out as follows using gas turbine oil meeting MILL-23699 (the U.S. Air Force Specifications) as a lubricant for the ball bearing. The phosphorus concentration of a phosphorus type extreme pressure additive in the lubricant was varied by adjusting with TCP. After revolving the bearing at 50000 rpm while oiling at a rate of 3 l/min, the oiling was stopped, and the bearing was run for an additional 10 minutes while measuring the temperature of the bearing. Thereafter, the bearing was taken apart, and each member was inspected. After the stop of oiling, the temperature of the bearing increased. As for those samples whose heat was dissipated without reaching to a constant temperature, the time for reaching the dissipation state, taken as a duration, was plotted against the phosphorus concentration of the lubricant.

The site of the surface treatment of the bearing and the extreme pressure additive content in the lubricant (oil) are shown in Table 3 below.

TABLE 3

|  | Lubricant | Site of Surface Treatment | Content of Extreme Pressure Additive (ppm) |
| --- | --- | --- | --- |
| Comparative Example 5 | Oil (Henkel 2939) | balls and inner and outer races | 0 |
| Example 5 | Oil + TCP | balls and inner and outer races | 10–10000 |

Figure 9:
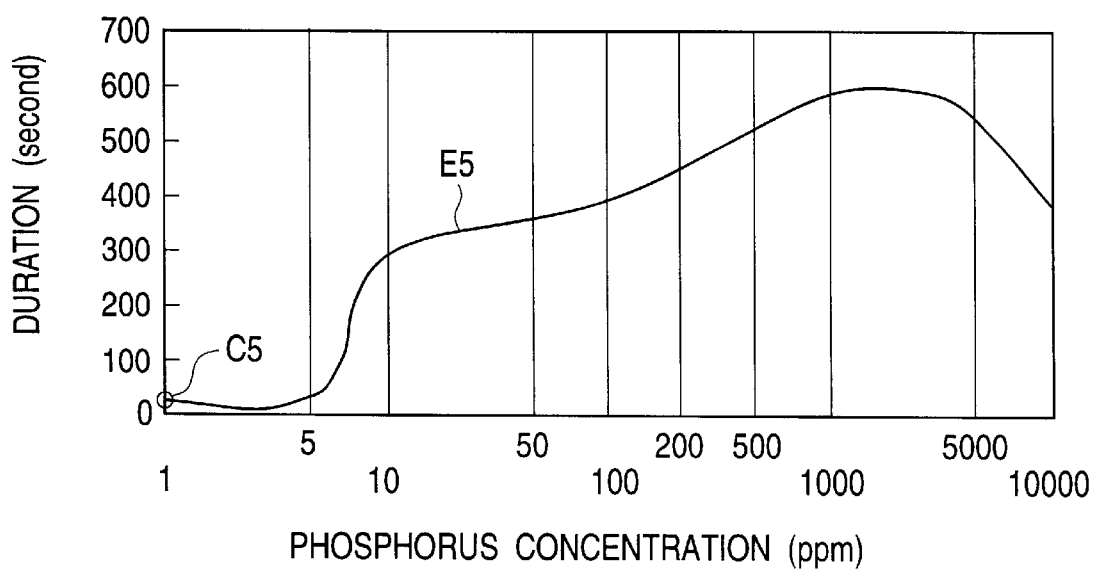
FIG. 9 is a graph showing the results of an evaluation test on a fifth embodiment of the present invention.

The relationship between duration (second) and concentration of the additive (P; ppm) is shown in FIG. 9, in which the curves indicated by E5 and C5 correspond to the results of Comparative Example 5 and Example 5, respectively.

From the test results of Example 5 compared with Comparative Example 5 (FIG. 9) it is seen that the effect on durability improvement is produced at a phosphorus concentration, originated in TCP, of 10 ppm or higher in gas turbine oil. At lower P concentrations, the effect of the additive is low. If the P concentration exceeds 10000 ppm, there will arise the problem of corrosion due to the water content in the oil. Accordingly, the phosphorus concentration in the lubricant is preferably 10 to 10000 ppm, still preferably 100 to 10000 ppm, particularly preferably 200 to 5000 ppm.

The phosphorus concentrations in commercially available gas turbine oil are, for example, 2000 to 5000 ppm in Mobile Jet Oil 2 and Mobile Jet Oil 2254; 400 ppm or more in Aeroshell Turbine Oil 555 and 560; 100 ppm or more in Exxon Turbo Oil 25; and 1500 ppm or more in Exxon Turbo Oil 238. Namely, any of these products has a phosphorus concentration falling within the effective range as specified in the present invention and is therefore adequate for the purpose of obtaining satisfactory durability in cooperation with the reaction product subsurface layer of the present invention.

Other commercially available lubricating oils and grease inclusive of those already containing at least one of organic phosphorus compounds, organic sulfur compounds, organic halogen compounds, and organometallic compounds as an extreme pressure additive are also suited as a lubricant to be used in the present invention. Examples of lubricants applicable to the present invention include commercially available turbine oil, gasoline engine oil, diesel engine oil, 2-cycle engine oil, racing engine oil, automatic transmission oil, gear oil, hypoid gear oil, and spindle oil. More specifically, examples of useful turbine oil, typified by gas turbine oil, are Mobile Jet Oil 254, Mobile Jet Oil 2, Aeroshell Turbine Oil 308, 390, 500, 555, 560 and 750, and Exxon Turbo Oil 2380, 25, 274, 85, 2389, and 390. Other useful oil and grease include those available from Exxon Chemical Corp., Esso Sekiyu K.K., NOK Kluber K.K., Kygnus Sekiyu K.K., Idemitsu Kosan Co., Ltd., Kyushu Oil Company, Limited., Kyodo Oil Co., Ltd., Kyodo Yushi Co., Ltd., Cosmo Oil Co., Ltd., San-Ai Oil Co., Ltd., Japan Energy K.K., Showa Shell Sekiyu Kabushiki Kaisha, Nippon Steel Chemical Co., Ltd., Dow Corning Corp., Nippon Grease K.K., Nippon Oil Company, Ltd., Fuji Kosan K.K., Mitsui Petrochemical Industries, Ltd., Matsumura Sekiyu K.K., Mitsubishi Oil Co., Ltd., Mobil Sekiyu K.K., and Yushiro Chemical Ind. Co., Ltd. The brands and manufacturers are not limited to the above-enumerated examples.

(VI) Sixth Embodiment

The same bearing for the main shaft of a supercharger as used in the fifth embodiment was used. A reaction product subsurface layer was formed to a varied depth while fixing the phosphorus concentration of a lubricant at 3000 ppm. The resulting surface treated bearings were tested for seizure resistance under a non-oiling condition in the same manner as described above.

The depth of the reaction product subsurface layer was controlled in a range of from 10 to 1000 nm by adjusting the reaction temperature and time. The samples were subjected to a seizure resistance test to examine the influence of the depth of a reaction product subsurface layer upon the life of a bearing. The lubricant used, the site of surface treatment conducted, and the depth of the formed reaction product subsurface layer are shown in Table 4 below.

TABLE 4

|  | Lubricant | Site of Surface Treatment | Depth of P Reaction Product Subsurface Layer (nm) |
| --- | --- | --- | --- |
| Comparative Example 6 | Oil + TCP | — | — |
| Example 6 | Oil + TCP | balls and outer and inner races | 10–1000 |

A lubricating oil containing TCP (P concentration: 3000 ppm) was used as a lubricant.

Figure 10:
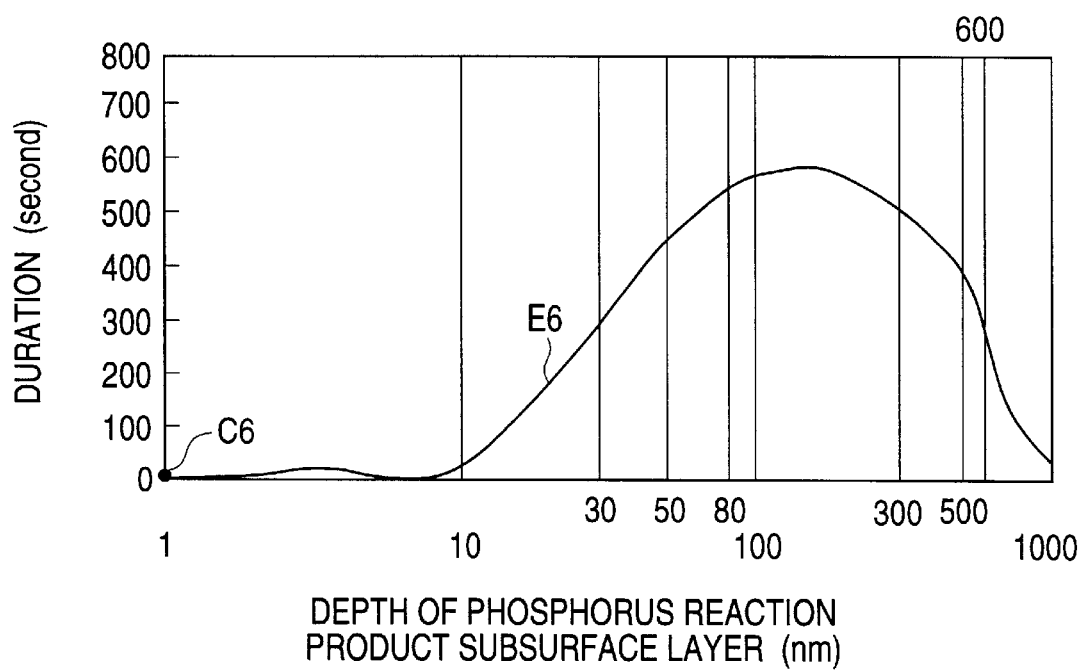
FIG. 10 is a graph showing the results of an evaluation test on a sixth embodiment of the present invention.

The relationship between depth (nm) of the reaction product subsurface layer and duration up to development of seizure (second) is shown in FIG. 10, in which the curves indicated by C6 and E6 correspond to the results of Comparative Example 6 and Example 6, respectively. Example 6 shown in FIG. 10 provides confirmation of the effect of the surface treatment according to the present invention. If the depth of the reaction product subsurface layer is less than 30 nm, the durability is poor. The depth is preferably 30 to 600 nm, still preferably 50 to 500 nm, particularly preferably 80 to 300 nm. If it exceeds 600 nm, the surface profile is deteriorated to reduce the durability improving effect.

Where commercially available oil, Mobile Jet Oil 2 or 254, was used in the above embodiment, the bearing had a durability of 600 sec. or longer when the reaction product subsurface layer had a thickness of 50 to 500 nm.

The reaction product subsurface layer in the above-described embodiments can also be formed by immersion under heat using commercially available gas turbine oil listed above as examples of useful lubricants.

While in the foregoing embodiments, the present invention has been described by referring to a rolling bearing as a rolling apparatus having a rolling member comprising a rolling element made of metal and its race element, the present invention is not construed as being limited to these embodiments. That is, the present invention is applicable to other rolling apparatus, such as a linear guide apparatus and a ball screw apparatus, as well. In the case of a ball screw apparatus, the metallic balls correspond to the "rolling element", and the screw channel on the ball screw axis to the "race element" for the rolling element, the balls and the ball screw axis constituting a "rolling member".

As described above, according to the present invention, a reaction product subsurface layer containing phosphorus, sulfur or halogen which is formed on the surface of the metallic rolling member of a rolling apparatus functions to improve the wettability of the surface of the metallic member by a lubricant. In addition, an extreme pressure component incorporated into a lubricant reacts with the activated reaction product subsurface layer to bring about improvements in resistance to seizure and wear of the rolling member over the conventional lubrication systems.

While the invention has been described in detail and with reference to specific embodiments thereof, it will be apparent to one skilled in the art that various changes and modifications can be made therein without departing from the spirit and scope thereof.

What is claimed is:

1. A rolling apparatus having a surface-treated rolling member composed of a metallic rolling element and a metallic race element which have been used with a lubricant,
   in which the surface of at least one of said rolling element and said race element has a reaction product subsurface layer containing phosphorus and oxygen and having a thickness of from about 30 to 600 nm, wherein the reaction product subsurface layer has been produced by the reaction between the metallic component of said rolling element or said race element and an organic phosphorus compound, said reaction product subsurface layer providing improved wettability by the lubricant to the metal surface of the at least one of the metallic rolling element and the metallic race element due to the formation of the react product subsurface layer containing the phosphorus compound, and
   wherein said lubricant contains, as an extreme pressure component, an organic phosphorus compound; wherein said lubricant contains said organic phosphorus compound at a concentration of 10 to 10,000 ppm in terms of phosphorus; and wherein said lubricant is present between the metallic contact surfaces of said rolling member and said race element, wherein the organic phosphorus compound of the extreme pressure component at the concentration of 10 to 10,000 ppm reacts with the reaction product subsurface layer, whereby film formation by the lubricant can be maintained, wherein the extreme pressure reaction film is previously formed in and on the metal surface prior to contact with the lubricant in order to improve wettability by the lubricant or to accelerate reaction between the reaction product subsurface layer and the extreme pressure component in the lubricant.

2. The rolling apparatus of claim 1, wherein said reaction product subsurface layer has a thickness of from 50 to 500 nm.

3. The rolling apparatus of claim 1, wherein said reaction product subsurface layer has a thickness of from 80 to 300 nm.

4. The rolling apparatus according to any one of claims 1, 2 or 3, wherein said lubricant contains said organic phosphorus compound at a concentration from 100 to 10,000 ppm in terms of phosphorus.

5. The rolling apparatus according to any one of claims 1, 2 or 3, wherein said lubricant contains said organic phosphorus compound at a concentration from 200 to 5,000 ppm in terms of phosphorus.

6. The rolling apparatus of claim 1, wherein said organic phosphorus compound is at least one compound(s) selected from the group consisting of phosphorus esters, orthophosphoric esters and acidic phosphoric esters.

7. A rolling apparatus having a surface-treated rolling member composed of a metallic rolling element and a metallic race element which have been used with a lubricant,
   in which the surface of at least one of said rolling element and said race element has a reaction product subsurface layer containing phosphorus and oxygen and having a thickness of from about 30 to 600 nm, wherein the reaction product subsurface layer has been produced by the reaction between a metallic component of said rolling element or said race element and an organic phosphorus compound,
   wherein said lubricant contains, as an extreme pressure component, an organic phosphorus compound; wherein said lubricant contains said organic phosphorus compound at a concentration of 10 to 10,000 ppm in terms of phosphorus; and wherein said lubricant is present between the metallic contact surfaces of said rolling member and said race element, said reaction product subsurface layer providing improved wettability by the lubricant to the metal surface of the at least one of the metallic rolling element and the metallic race element due to the formation of the reaction product subsurface layer containing the phosphorus compound, and
   wherein the organic phosphorus compound of the extreme pressure component at the concentration of 10 to 10,000 ppm reacts with the activated reaction product subsurface layer, whereby film formation by the lubricant can be maintained to thereby improve seizure resistance and wear resistance, wherein the extreme pressure reaction film is previously formed in and on the metal surface prior to contact with he lubricant in order to improve wettability by the lubricant or to accelerate reaction between the reaction product subsurface layer and the extreme pressure component in the lubricant.

8. A rolling apparatus having a surface-treated rolling member composed of a metallic rolling element and a metallic race element which have been used with a lubricant,
   in which the surface of at least one of said rolling element and said race element has a reaction product subsurface layer containing phosphorus and oxygen and having a thickness of from about 30 to 600 nm, wherein the reaction product subsurface layer has been produced by the reaction between the metallic component of said rolling element or said race element and an organic phosphorus compound, said reaction product subsurface layer providing improved wettability by the lubricant to the metal surface of the at least one of the metallic rolling element and the metallic race element due to the formation of the reaction product subsurface layer containing the phosphorus compound, and
   wherein said lubricant contains, as an extreme pressure component, an organic phosphorus compound; wherein said lubricant contains said organic phosphorus compound at a concentration of 10 to 10,000 ppm in terms of phosphorus; and wherein said lubricant is present between the metallic contact surfaces of said rolling member and said race element, wherein the organic phosphorus compound of the extreme pressure component at the concentration of 10 to 10,000 ppm reacts with the reaction product subsurface layer, whereby film formation by the lubricant can be maintained, wherein the extreme pressure reaction film is previously formed in and on the metal surface prior to contact with the lubricant in order to improve wettability by the lubricant or to accelerate reaction between the reaction product subsurface layer and the extreme pressure component in the lubricant, wherein the surfaces of said element and said race element have a reaction product subsurface layer.

* * * * *